United States Patent [19]

Peetz et al.

[11] Patent Number: 4,852,670

[45] Date of Patent: Aug. 1, 1989

[54] DRILLING TOOL WITH AN EXCHANGEABLE FEED HELIX

[75] Inventors: Wolfgang Peetz, Blitzenreute; Bernhard Moser, Altshausen, both of Fed. Rep. of Germany

[73] Assignee: Hawera Probst GmbH & Co., Ravensburg, Fed. Rep. of Germany

[21] Appl. No.: 103,754

[22] Filed: Oct. 2, 1987

[30] Foreign Application Priority Data

Oct. 18, 1986 [DE] Fed. Rep. of Germany ....... 3635538

[51] Int. Cl.$^4$ ............................................. E21B 10/62
[52] U.S. Cl. ................................... 166/323; 166/321; 408/226
[58] Field of Search ............... 175/321, 323, 394, 395, 175/121, 310, 414; 408/226

[56] References Cited

U.S. PATENT DOCUMENTS

| 2,116,359 | 5/1938 | McCann | 175/323 |
| 2,438,637 | 3/1948 | Jansen | 175/323 |
| 4,393,947 | 7/1983 | Lutze et al. | 175/323 |
| 4,484,642 | 11/1984 | Evans | 175/323 |

FOREIGN PATENT DOCUMENTS

| 0237716 | 1/1965 | Austria | 175/414 |
| 269356 | 1/1914 | Fed. Rep. of Germany . | |
| 1915512 | 9/1964 | Fed. Rep. of Germany . | |
| 1427732 | 12/1968 | Fed. Rep. of Germany . | |
| 2543578 | 4/1977 | Fed. Rep. of Germany . | |
| 2639310 | 3/1978 | Fed. Rep. of Germany . | |
| 3044775 | 7/1982 | Fed. Rep. of Germany . | |
| 8514422 | 3/1985 | Fed. Rep. of Germany . | |
| 3517560 | 11/1986 | Fed. Rep. of Germany . | |
| 588987 | 6/1977 | Switzerland . | |
| 0542817 | 2/1977 | U.S.S.R. | 175/323 |
| 0954556 | 9/1982 | U.S.S.R. | 175/414 |
| 1153036 | 4/1985 | U.S.S.R. | 175/323 |
| 375596 | 6/1932 | United Kingdom . | |
| 836034 | 6/1960 | United Kingdom . | |

Primary Examiner—Jerome W. Massie, IV
Assistant Examiner—Terry Lee Melius
Attorney, Agent, or Firm—Spencer & Frank

[57] ABSTRACT

The drilling tool proposed serves for making perforations and is equipped with an exchangeable feed helix. To prevent the feed helix from being damaged if the drilling tool becomes tilted or if the feed helix is jammed, the feed helix can execute a specific stroke by means of a supporting spring, in such a way that the drill shank can rotate freely relative to the feed helix.

11 Claims, 2 Drawing Sheets

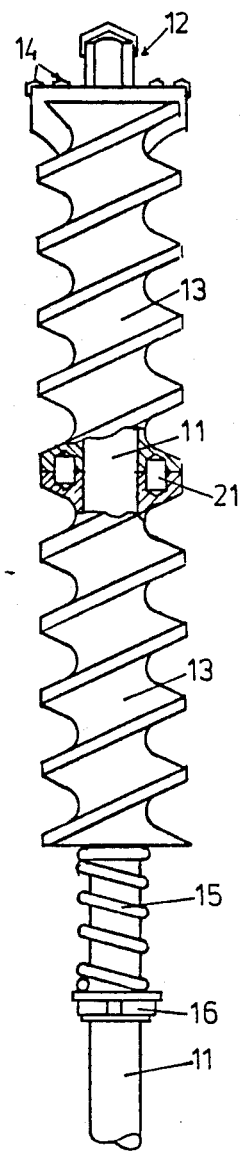
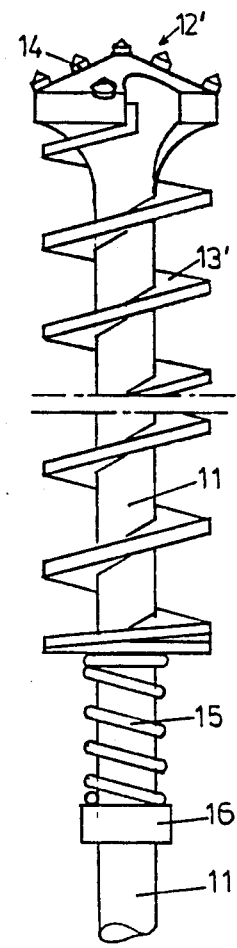
Fig 3
Fig 4

DRILLING TOOL WITH AN EXCHANGEABLE FEED HELIX

BACKGROUND OF THE INVENTION

1. Field of the Invention

The invention relates to a drilling tool with an exchangeable feed helix.

2. Discussion of the Prior Art

The applicant's German Utility Model GM 8,514,422 discloses a slip-on feed helix, which is secured axially by means of an axiall support. The drill shank has, in the region of the bottom edge of the slip-on helix, a recessed groove for receiving the supporting device, and radial expansion of the supporting device is prevented by non-positive or positive means.

Drilling tools with exchangeable feed helices are used predominantly for making perforations, with electric or pneumatically driven hammer drills being employed. The drill head is designed as a cross-type drill head or as a full drill head, fitted with carbide in either case. Tools of this type are illustrated, for example, in German Offenlegungsschrift Nos. 2,639,310, DE 3,044,775 A1 and DE 2,543,578 A1.

When perforations are made in fissured rock, the slip-on feed helix is exposed to high forces when, for example, rock becomes jammed between the drill-hole and the feed helix. Moreover, it can happen that, during drilling, the feed helix catches in the drill-hole. In the event of a further impact load exerted on the drill shank, the feed helix and the axial fastening, are pushed off from the shank or destroyed. Because the helix is limited and fixedly attached in the axial direction, axial play can arise as a result of the high axial vibrations, thereby suggesting that the particular design does not work very well.

The disadvantages described above apply both to continuous feed helices, that is to say feed helices with an outer structure similar to that of a drill, and to coiled feed helices.

SUMMARY OF THE INVENTION

The object on which the invention is based is to improve a drilling tool with a feed helix so that the feed helix always has a firm axial seat during operation, and furthermore that the feed helix is not damaged or destroyed when it is jammed relative to the drill shank.

The invention is based on the essential idea that securing or supporting the feed helix axially by means of an additional spring always guarantees the most effective possible seat or rest of the feed helix on the drill head. The feed helix is therefore mounted free of play between the drill head and the axial support. On the other hand, the feed helix is deliberately given an axial play relative to the shank. Should the feed helix become jammed or blocked, it will shift axially and the drill shank will be freely rotatable without the feed helix. This prevents light-weight plastic helices, in particular, from being destroyed. The axial play predetermined by the supporting spring is preferably calculated in such a way that the feed helix can be pushed axially out of the positive locking connection on the drill head and, when the feed helix is blocked, the drill shank is nevertheless still freely rotatable. The necessary axial displaceability therefore depends on the geometrical design of the drill head and the positive locking device between the exchangeable feed helix and the drill head.

In a development of the invention, it is advantageous if the winding direction or pitch of the supporting spring is opposite to the direction of rotation or pitch of the feed helix, so that the supporting spring does not expand when the feed helix is blocked.

A solid plastic helix in particular is suitable as an exchangeable feed helix. However, other types of slip-on helices can also be used on the principle according to the invention, especially a feed helix composed of a coiled T-, L- or Z-profile, as proposed in the applicant's older German application P No. 35 17 560.5, corresponding to U.S. Ser. No. 06/862,243 filed May 12, 1986.

According to the invention the helix portions can also be easily coupled to one another by means of a positive connection for the purpose of lengthening the feed helix. The coupling is made via positive connection elements, such as locking pins, key and keyway, etc.

According to the invention, the supporting force of the supporting spring is calculated in such a way that, during drilling, normal axial forces exerted on the feed helix are compensated. A supporting spring with a flat spring characteristic is recommended here so that, in the event of overloading, the positive connection between the feed helix and the drilling tool is broken.

BRIEF DESCRIPTION OF THE DRAWINGS

Advantageous and expedient exemplary embodiments of the invention are illustrated in the drawing and explained in detail in the following description. In the drawing:

FIG. 3 shows a drilling tool with two feed helices which are arranged above one another and which are connected to one another by means of a positive connection.

FIG. 4 shows a drilling tool with a coiled feed helix.

DESCRIPTION OF THE PREFERRED EMBODIMENTS

Figures 1, 2:
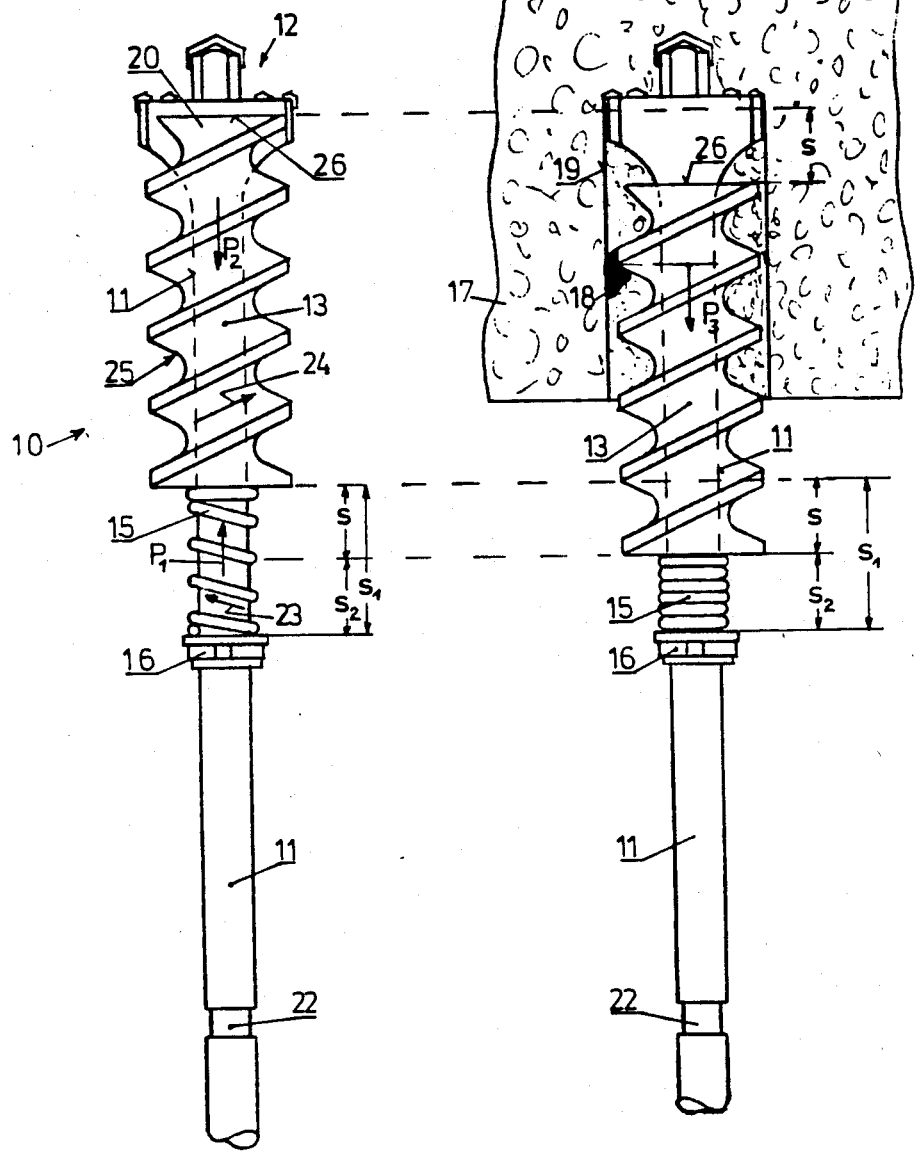
FIG. 1 shows a side view of a drilling tool according to the invention in the no-load state.
FIG. 2 shows the drilling tool according to FIG. 1 with the feed helix blocked and displaced axially relative to the shank.

The drilling tool (10) illustrated in FIGS. 1 and 2 comprises a drill shank (11) with a cross-type drill bit (12), as illustrated and described, for example, in DE No. 3,426,977 A1, FIGS. 3 and 4, for making wall perforations or the like. The slip-on and exchangeable feed helix (13) is connected to the drill head (12) positively and so as to be held against rotation. The slip-on helix in FIG. 1 is designed as a full-profile plastic helix that is to say the feed surface has a conventional drill-helix profile.

Instead of the solid plastic helix (13), a coiled feed halix (13') according to the illustration in FIG. 4 can also be used. Furthermore, this drilling tool is equipped with a drill bit designed as a full head (12') having carbide inserts (14).

According to the invention, the feed helix (13) is designed with an axial play "s" relative to the drill shank (11), which is compensated by a supporting spring (15) between the feed helix (13) and supporting device (16). The prestress of the supporting spring (15) (prestressing force $P_1$) is calculated in such a way that the axial force $P_2$ normally arising during drilling and exerted on the feed helix (13) is compensated, that is to say $P_1 \geq P_2$. This always guarantees that the feed helix

(13) is pressed against the drill head (12) in a firm seat and without play at all times. The supporting device (16) can be designed according to Utility Model GM 8,514,422, as described in the introduction.

FIG. 2 illustrates the particular circumstance, in which the feed helix (13) has to shifted axially relative to the drill shank (11) by the amount "s". When a fissured rock (17) in particular is being drilled, it can easily happen that a rock (18) already loosened jams between the drill-hole (19) and the feed helix (13), so that the feed helix (13) is blocked against further rotation, but the hammer mechanism continues to drive the drill shank forward. In this case, a plastic feed helix, for example, would easily be destroyed. It is therefore necessary for the feed helix (13) to be disengaged from the drill head, that is to say the positive connection (20) on the drill head (12) must be broken. According to the invention, as a result of this axial force $P_3$ exerted on it, the feed helix (13) can move counter to the pressure of the spring (15), until the drill head (12) or the drill shank (11) can rotate freely, while the feed helix (13) is stationary. In FIG. 2, the supporting spring (15) has therefore been compressed from the original length $s_1$ to the length $s_2$, that is to say by the amount "s". The top edge (26) of the helix is accordingly pushed axially downwards by the amount "s" (FIG. 2).

Also when the drilling tool (10) is pushed through a wall (17) when making perforations in the wall, the drill head (12) can pass through the wall while the feed helix (13) is still caught on the remaining rock. In this case too, a rotational coupling between the drilling tool (11, 12) and the feed helix (13) is broken as a result of the axial displaceability. By means of this measure, it is possible, for example, to do without expensive drilling tools with a quadruple cross-type drilling head, in which tilting of the feed helix can be prevented.

FIG. 3 shows a further exemplary embodiment of the invention. Here, two feed helices (13) are connected to one another by means of a positive connection (21) comprising locking pins, in order to make it possible to lengthen the feed helix. The supporting spring (15) then supports the lower feed helix (13), while the supporting device (16) is fastened in the lower recessed groove (22) shown in FIGS. 1 and 2.

Of course, instead of the locking and fastening pins (21), other positive connections, for example a key and keyway or the like, can also be used.

The invention is not restricted to the exemplary embodiment illustrated and described. It embraces all the modifications and developments of the drilling tool according to the invention which are achieved by one of ordinary skill in the art.

We claim:

1. A drilling tool, for making perforations in concrete and masonry comprising:
   a drill shank having a drill head located at one end of said drill shank;
   an exchangeable feed helix means coaxially disposed around said drill shank with one end of said feed helix means disposed adjacent a portion of said drill head thereby defining a position where rotation of said feed helix means relative to said drill shank is prevented;
   a supporting device fixed to said drill shank at a location closer to the other end of said feed helix means; and
   a supporting spring means positioned between said feed helix means and said supporting device for axially bracing said feed helix in said position up to a predetermined external force which acts on said feed helix means and for allowing axial displacement of said feed helix means relative to said drill shank when said predetermined force is reached, said supporting spring means and said feed helix means each having a pitch such that the pitch of said supporting spring means is oriented opposite to the pitch of said feed helix means.

2. A drilling tool as defined in claim 1, wherein said feed helix means is composed of plastic.

3. A drilling tool as defined in claim 1, wherein said feed helix means is composed of metal.

4. A drilling tool as defined in claim 1, wherein said feed helix means has a full feed-screw profile.

5. A drilling tool as defined in claim 1, wherein said feed helix means has a coiled profile.

6. A drilling tool as defined in claim 1, wherein said supporting spring means has flat spring characteristics with a supporting force of at most 200N.

7. A drill tool comprising:
   a drill shank having a drill head;
   an exchangeable feed helix means mounted on said shank for axial movement thereon between two positions in one of which one end of said helix means is near said drill head, said one end of said helix means being closer to said drill head when said helix means is in said one position than when said helix means is in the other of its positions, said drill shank being non-rotatable relative to said helix means when said helix means is in its one position and being rotatable relative to said helix means when said helix means is in its other position; and
   spring means on said shank and having one end of said spring means in engagement with said other end of said helix means, the other end of said spring means being arranged axially non-movably on said shank and biassing said helix means towards its one position, in consequence of which said helix means is, in normal operation of the drill tool, non-rotatable with respect to said shank whereas when said helix means engages an obstacle, said helix means can move axially out of its one position and into its other position, thereby allowing said drill shank to rotate.

8. A drilling tool, for making perforations in concrete and masonry comprising:
   a drill shank having a drill head located at one end of said drill shank;
   an exchangeable feed helix means coaxially disposed around said drill shank with one end of said feed helix means disposed adjacent a portion of said drill head thereby defining a position where rotation of said feed helix means relative to said drill shank is prevented, and said feed helix means including several feed helices connected together;
   a supporting device fixed to said drill shank at a location closer to the other end of said feed helix means; and
   a supporting spring means positioned between said feed helix means and said supporting device for axially bracing said feed helix in said position up to a predetermined external force which acts on said feed helix means and for allowing axial displacement of said feed helix means relative to said drill shank when said predetermined force is reached.

9. A drilling tool as defined in claim 8, wherein said feed helices are connected together by locking pins.

10. A drilling tool as defined in claim 8, wherein said feed helices are connected together by a key and keyway connection.

11. A drilling tool, for making perforations in concrete and masonry comprising:

a drill shank having a drill head located at one end of said drill shank;

an exchangeable feed helix means coaxially disposed around said drill shank with one end of said feed helix means contacting a side face of said drill head thereby defining a first position where rotation of said feed helix means relative to said drill shank is prevented;

a supporting device fixed to said drill shank at a location closer to the other end of said feed helix means; and a supporting spring means positioned between said feed helix means and said supporting device for axially bracing said feed helix in said first position up to a predetermined external force which acts on said feed helix means and for allowing axial displacement of said feed helix means relative to said drill shank to a second position when said predetermined force is reached, whereby said drill shank is freely rotatable relative to said feed helix means when said drill shank is in said second position.

* * * * *